United States Patent Office 3,355,401
Patented Nov. 28, 1967

3,355,401
ALKALI SOLUBLE ESTERS OF EPOXY RESINS
Edward Butler Tanner, Hampton, England, assignor to Pinchin, Johnson & Associates Limited, London, England, a British company
No Drawing. Filed Apr. 7, 1964, Ser. No. 358,062
Claims priority, application Great Britain, Apr. 16, 1963, 14,781/63
14 Claims. (Cl. 260—18)

This invention relates to condensation polymers and in particular to polymers which are suitable for use as coating compositions, particularly water-thinable compositions, which can be applied by standard methods and then stoved. One important aspect of this invention relates to the production of coating compositions which can be applied by electrodeposition methods to provide coatings which, after stoving, are substantially resistant to alkalis.

In accordance with this invention condensation polymers are obtained by condensing a glycidyl polyether of a dihydric phenol with (a) at least one monobasic fatty acid, which may be saturated or unsaturated, or a mixture of saturated and unsaturated acids, and (b) at least one fatty acid containing in the molecule at least two carboxyl groups, at least one of which is attached to a polymethylene group containing at least 4 carbon atoms, or the anhydride of such a fatty acid, such that the individual proportion of (a) and of (b) does not exceed the chemical equivalent of the glycidyl polyether.

The glycidyl polyether of a polyhydric phenol used in this invention is the condensation product of epichlorhydrin and a dihydric phenol. Examples of suitable phenols are diphenylol propane, hydroquinone and resorcinol. Such condensation products are also known as epoxide resins and for brevity they will be referred to as such in this specification. As is well-known, a number of epoxide resins are commercially available, for example those sold under the registered trademark "Epikote" in Great Britain or under the registered trademark "Epon" in the United States.

Examples of monobasic unsaturated fatty acids which may be used are the drying oil fatty acids, for example those of linseed oil and dehydrated castor oil. The unsaturated acids themselves, for example linoleic acid may be used. Examples of saturated fatty acids which may be used are lauric acid and other long chain fatty acids, and 12-hydroxy stearic acid. Rosin may also be used either alone as an unsaturated acid or in conjunction with a drying oil fatty acid or with a saturated acid such as lauric acid.

The polybasic fatty acid may be a long chain dicarboxylic acid such as adipic acid or sebacic acid or it may be a dimerised fatty acid (otherwise known as a dimer acid) or mixture thereof, for example dimerised soya bean oil fatty acids. Dicarboxylic acids such as phthalic acid or terephthalic acid are excluded. Tribasic fatty acids may also be used, for example the commercially available acids and mixtures having the general formula:

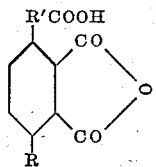

where R is a pentyl or hexyl group and R' is:

—$(CH_2)_7$— or —$(CH_2)_8$—

The combined chemical equivalent proportions of the acids (a) and (b) used may be less than, equal to, or greater than the equivalent molar proportion of the epoxide resin. The actual proportions used depend mainly on the particular properties required in the final coating. For example, when alkali resistance is the principal requirement, the combined chemical equivalent of (a) and (b) is preferably below the chemical equivalent of the epoxide resin, and we have successfully used a mixture of acids equivalent to 60 to 70 percent of the epoxide resin to produce alkali resistant finishes. On the other hand, higher proportions, which may exceed an equivalent molar proportion, may be used when softer and more flexible coatings are required. In a mixture of monobasic and dibasic acids, the monobasic acid preferably predominates and the proportion of monobasic acid to dibasic acid may conveniently range from 1.1 to 5:1. The chemical equivalent of an epoxide resin is defined as the grams of resin required to esterify completely 1 gram mol of monobasic acid, fo rexample 60 grams of acetic acid or 280 grams of $C_{18}$ fatty acid.

The process according to this invention may be carried out in a single stage by heating together a mixture of the epoxide resin and the monobasic and polybasic acid. Alternatively, the epoxide resin may be reacted first with one acid and the reaction product obtained reacted with the other acid. This method is preferred when using tribasic acids which tend to cross-link the product, the tribasic acid being used in the second stage of the reaction.

In carrying out the condensation according to this invention, water is eliminated and this should be removed or rendered innocuous as it is formed. This can conveniently be effected by carrying out the condensation under reflux in the presence of a high boiling solvent such as xylene and removing the water as an azeotrope. Small proportions of xylene or other high-boiling solvents in the resinous product are not detrimental and need not be removed when making coating compositions.

For the preparation of coating compositions, the resin condensate is mixed with a solvent and a neutralising agent such as an alkali. For compositions to be applied by conventional processes such as brushing or spraying the neutralising agent should be volatile. For these purposes suitable neutralising agents are diethylamine, triethylamine, mono-ethanolamine, diethanolamine, triethanolamine, morpholine, dimethyl amino ethanol, diethyl amino ethanol, ammonia, and mono iso-propanolamine. For electrodepositions a volatile or a non-volatile neutralising agent such as caustic soda may be used:

The solvent used is an amphipathic solvent, that is to say a compound containing one or more polar groups segregated from a relatively large non-polar group; such a solvent assists in dissolving or dispersing the resin in water. Certain solvents such as the butyl alcohols in conjunction with a slight excess of an alkali will dissolve the resins to form substantially clear solutions while others form solutions which show varying degrees of opalescence and others still lead to the formation of emulsions. While all these types of solutions and emulsions can be used for coating compositions, we prefer to use clear solutions capable of being diluted infinitely with water as the paint basis.

The resin solutions and emulsions, which may be pigmented if desired, may be applied as coating compositions by any of the known methods, for example by dipping or by brushing. They may also be applied by electrodeposition by immersing the article to be coated as one electrode in a bath of the resin, and, by means of a suitable cathode, for example the container used for the resin, passing an electrical current through the bath.

The resinous product of this invention may also be used to emulsify an alkyd resin containing a pigment dispersed therein. The resinous emulsion so obtained may also be infinitely dilutable with water and thinned emulsions may be applied by dipping, electrodeposition or other methods in the same way as the solutions or emulsions of the products of this invention.

The invention is illustrated by the following examples in which parts and percentages are by weight:

EXAMPLE 1

(A) *Preparation of the resin*

Recipe:

| | |
|---|---|
| "Epikote" 1001 | 130 grams (1 gm. equivalent). |
| Dehydrated castor oil fatty acids | 84 grams (0.3 gm. equivalent). |
| Rosin | 34 grams (0.1 gm. equivalent). |
| Dimerised linoleic-rich fatty acid (Dimac S) | 60 grams (0.2 gm. equivalent). |
| Xylene (for reflux) | 20 grams. |

Epikote 1001 ("Epon 1001") is a condensation product of epichlorhydrin and diphenylol propane, having a melting point of 74–76° C., an epoxide equivalent of 450 to 525 and an average molecular weight of 900 to 1000.

"Dimac S" is, as indicated, a dimerized linoleic-rich fatty acid having an acid value of 180/190, a saponification value of 192/198, an iodine value (Kaufmann) of 90/97, a viscosity of 126/133 stokes and containing a maximum one percent of unsaponifiable matter.

Four times the weights of the above ingredients were placed in a flask fitted with a Dean and Stark apparatus. The mixture was heated and reaction set in at 180–190° C. Water was removed as an azeotrope with xylene as it was formed by means of the Dean and Stark apparatus. After 1 hour the temperature had risen to 210–215° C. and 11.0 grams of water had been removed.

The product was a 92.5 percent non-volatile content solution, acid value=30 mg. KOH/gram.

(B) *Effect of solvents*

The resin was then tested with a number of amphipathic solvents, as specified below, in a composition having the general formulation:

| | Parts |
|---|---|
| Resin | 10 |
| Solvent | 2 |
| 5 percent aq. NaOH | 4.5 |
| Water | [1] 28 |

[1] That is, to 20 percent non-volatile content.

The results obtained with different solvents were as follows:

| Solvent: | Description of composition |
|---|---|
| Butyl alcohol, iso-butyl alcohol, sec-butyl alcohol, butyl dioxitol | Clear, very slight opalescent solution. |
| Isophorone, methyl cyclohexanone, diacetone alcohol | Opalescent solution, rather more opaque than above. |
| Methyl glycol acetate, oxitol acetate | White emulsion. |

All these compositions could be infinitely diluted with water.

In all the above compositions, the caustic soda may be replaced by ammonia, an instance of such a composition being given in Section C below.

(C) *Coating compositions*

A solution of the resin was prepared as follows:

| | Parts |
|---|---|
| Resin | 100 |
| 0.880 ammonia | 11 |
| Butyl alcohol | 20 |
| Water | 337.5 |

The non-volatile content was then adjusted with water to 20 percent.

The composition was a light coloured solution, very slightly opalescent and capable of infinite dilution with water.

The composition was compounded with a red oxide pigment using a weight ratio, based on solids, of 1:1. The product obtained was a paint capable of being applied to articles by conventional dipping technique. In an example, an article was dipped in and removed from the paint, a short flash off period was allowed and the coating was then baked for 30 minutes at 150° C. Water-dispersible driers may be incorporated in the paint to reduce the stoving schedules.

(D) *Electrodeposition*

The 20 percent resin solution specified in C above was electrodeposited on a metal article by applying 48 volts for 1 minute using a standard technique with the paint container as the metal cathode. On baking the film for 30 minutes at 150° C., a tough, glossy, flexible, mar-proof film was obtained.

If a coloured coating is required the solution may be pigmented at a ratio of 1 part of pigment to 3 parts of solids contents of resin solution.

EXAMPLE 2

Recipe:

| | |
|---|---|
| "Epikote 1001" ("Epon 1001") | 130 grams (1 gm. equivalent). |
| Lauric acid | 80 grams (0.4 gm. equivalent). |
| "Dimac S" | 60 grams (0.2 gm. equivalent). |
| Xylene (for reflux) | 20 grams. |

The ingredients were heated together in the same type of apparatus, and by the same procedure described in Example 1, and the temperature was maintained at 190–195° C. for 2 hours. The product was a 90 percent non-volatile resinous solution, of acid value 42 mg. KOH/gm.

The resin may be solubilised according to the procedure of Example 1, preferably using butyl alcohol as the amphipathic solvent. The aqueous dispersion obtained was only slightly more turbid than the butyl alcohol solution of the resin of Example 1, and could be used in the same way as a coating composition either for conventional dipping applications or by electrodeposition, followed by baking for 30 minutes at 150° C.

EXAMPLE 3

Recipe:

| | |
|---|---|
| "Epikote 1001" ("Epon 1001") | 130 grams (1 gm. equivalent). |
| Lauric acid | 140 grams (0.7 gm. equivalent). |
| "Dimac S" | 180 grams (0.6 gm. equivalent). |
| Xylene (for reflux) | 50 grams. |

The ingredients were heated together in the same type of apparatus, and by the same procedure described in Example 1, and the temperature was maintained at approximately 200° C. for 2 hours. The product was a 90 percent non-volatile resinous solution, of acid value=90 mg. of KOH/gm.

After cooling it was solubilised by admixture in the following proportions:

Resin solution as above _____ gm__ 77
Butyl alcohol _____ ml__ 25
Diethylamine _____ ml__ 13.7

This solution could be infinitely diluted with water to give slightly turbid solutions. After being diluted to 10 percent non-volatile content it was used to coat by electrodeposition a steel panel, which was made the anode in a cell in which a potential difference of 40 volts was applied for 1 minute. On baking the deposit for 30 minutes at 150° C., a clear, tough, glossy, flexible and adherent film was obtained.

EXAMPLE 4

A two-stage procedure was used in this example.

Stage 1

Recipe:
"Epikote 1001"
("Epon 1001") __ 130 grams (1 gm. equivalent).
Dehydrated
castor oil _____ 84 grams (0.3 gm. equivalent).
Rosin _____ 34 grams (0.1 gm. equivalent).
Xylene (for reflux) _ 10 grams.

The ingredients were heated together in the same type of apparatus, and by the same procedure described in Example 1. The temperature was maintained at approximately 220° C. for 1¼ hours, during which time the acid value fell to 18 mg. KOH/gm.

Stage 2

125 gm. (1 gm. equivalent) of a tribasic acid product were added to the reaction product of Stage 1. The temperature was maintained during a further 40 minutes at 185–190° C. The product was then cooled and thinned to a 70 percent non-volatile solution in xylene, the acid value of which was found to be 67 mg KOH/gm.

The tribasic acid product is thought to have the formula:

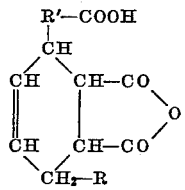

where R=a pentyl or hexyl group and R' is a polymethylene chain having 7 or 8 carbon chain, such compounds are described by Danzig et al. in J. Amer. Oil Chem. Soc., 1957, vol. 34, page 136.

The reaction product of Stage 2 was then solubilised as follows:

70 percent solution in xylene _____ gm__ 400
Diethylamine _____ ml__ 78
Water _____ gm__ 400

The result was a viscous opalescent solution, 40 percent non-volatile, capable of infinite dilution with water.

A portion of this solution was further reduced in viscosity by the addition of 10 percent of butyl alcohol. This thinned portion was applied to a steel panel by pouring; after a short draining period in a vertical position, the panel was baked for 10 minutes at 150° C. The baked film was hard, tough, clear and adherent. The thicker portion which had collected at the lower edge of the panel was substantially free from bubbles.

EXAMPLE 5

The resin of Example 1 was used to emulsify an alkyd resin solution into which a pigment had been dispersed.

Recipe
PART A—THE PIGMENT DISPERSION

| | Grams |
|---|---|
| Rutile titanium dioxide _____ | 181 |
| Medium oil length hardened castor oil alkyd resin__ | 117.5 |
| Butyl alcohol _____ | 17.5 |
| Xylene _____ | 12 |
| Dioxitol _____ | 170 |
| A butylated melamine-formaldehyde resin solution _ | 45 |

PART B—THE SOLUBILISED RESIN

| | |
|---|---|
| Resin of Example 1 _____ | 200 |
| Diethylene glycol monoethyl ether _____ | 40 |
| .880 SG. ammonia solution _____ | 30 |
| Water _____ | 90 |

Preparation and application of paint

Parts A and B were first mixed in the proportions indicated, and then diluted by the gradual addition, with stirring, of 2850 grams of water.

The thinned paint so produced was used to coat a steel pressing by anodic electrodeposition at a potential difference of 120 volts applied for 2 minutes. The deposit after baking for 30 minutes at 280° F. was hard and adherent. It was opaque, of egg-shell gloss, and slightly off-white in colour.

What I claim is:

1. A process for the manufacture of water-thinnable coating compositions which comprises preparing a condensation polymer by heating together and thereby condensing, with the elimination of water, a glycidyl polyether of a dihydric phenol with a combination of at least two acidic materials, said combination consisting essentially of
    (a) at least one monobasic fatty acid, and
    (b) at least one dimerised fatty acid, the individual proportions of (a) and of (b) being such that (i) they do not exceed the chemical equivalent of the glycidyl polyether and (ii) the acid number of the condensation polymer is in the range of 30 to 90 mgm. KOH/gm., neutralizing the condensation polymer so obtained and adding an amphipathic solvent and water to the neutralized condensation polymer.

2. The process claimed in claim 1 wherein the chemical equivalent proportion of the monobasic acid (a) exceeds the chemical equivalent proportion of the dimerised fatty acid.

3. The process claimed in claim 1 wherein the monobasic acid is unsaturated.

4. The process claimed in claim 3 wherein the unsaturated monobasic acid is dehydrated castor oil fatty acids.

5. The process claimed in claim 1 wherein rosin is included as an additional reactant in the condensation step.

6. The process claimed in claim 1 wherein the monobasic acid is a saturated acid.

7. The process claimed in claim 6 wherein the monobasic acid is lauric acid.

8. A water-thinnable coating composition comprising a condensation polymer of a glycidyl polyether of a dihydric phenol with a combination of at least two acidic materials, said combination consisting essentially of
    (a) at least one monobasic fatty acid, and
    (b) at least one dimerised fatty acid, the individual proportions of (a) and of (b)) being such that they do not exceed the chemical equivalent of the glycidyl polyether and that the acid number of the condensation polymer is in the range of from 30 to 90 mgm. KOH/gm., an amphipathic solvent, water and a neutralizing agent for the condensation polymer.

9. The composition claimed in claim 8 wherein the chemical equivalent proportion of the monobasic acid (a) exceeds the chemical equivalent proportion of the dimerised fatty acid.

10. The composition claimed in claim 8 wherein the monobasic acid is unsaturated.

11. The composition claimed in claim 10 wherein the unsaturated monobasic acid is dehydrated castor oil fatty acids.

12. The composition claimed in claim 8 wherein rosin is included as an additional component in the condensation polymer.

13. The composition claimed in claim 8 wherein the monobasic acid is a saturated acid.

14. The composition claimed in claim 13 wherein the monobasic acid is lauric acid.

References Cited

UNITED STATES PATENTS

| | | | |
|---|---|---|---|
| 3,027,341 | 3/1962 | Boucher et al. | 260—18 X |
| 3,251,790 | 5/1966 | Christenson et al. | 260—18 |
| 3,308,077 | 3/1967 | Pattison et al. | 260—18 X |

DONALD E. CZAJA, *Primary Examiner.*

LEON J. BERCOVITZ, *Examiner.*

C. W. IVY, *Assistant Examiner.*